July 11, 1950 H. C. SEYMOUR 2,514,805
FORM FOR MAKING CONCRETE SLABS
Filed Feb. 9, 1948 5 Sheets-Sheet 1
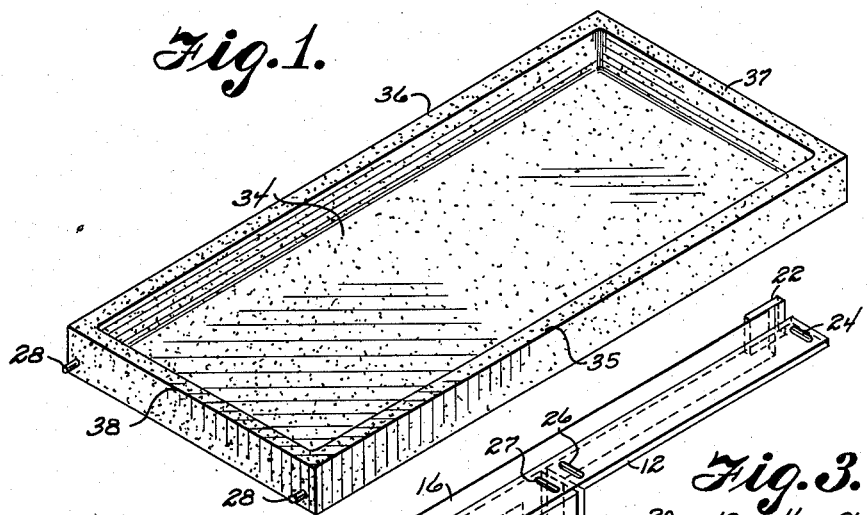
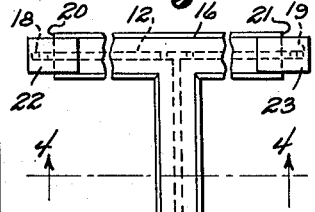
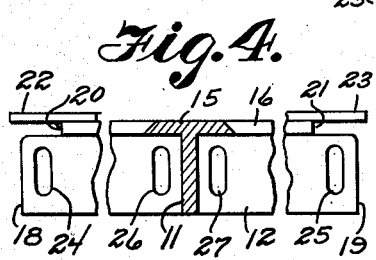
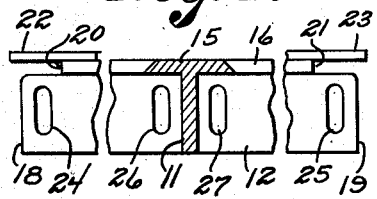
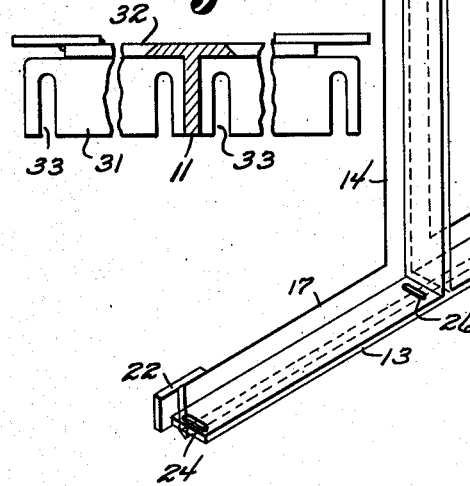
INVENTOR.
Howard C. Seymour
BY Victor J. Evans & Co.
ATTORNEYS July 11, 1950  H. C. SEYMOUR  2,514,805
FORM FOR MAKING CONCRETE SLABS
Filed Feb. 9, 1948  5 Sheets-Sheet 2

INVENTOR.
Howard C. Seymour
BY Victor J. Evans & Co.
ATTORNEYS

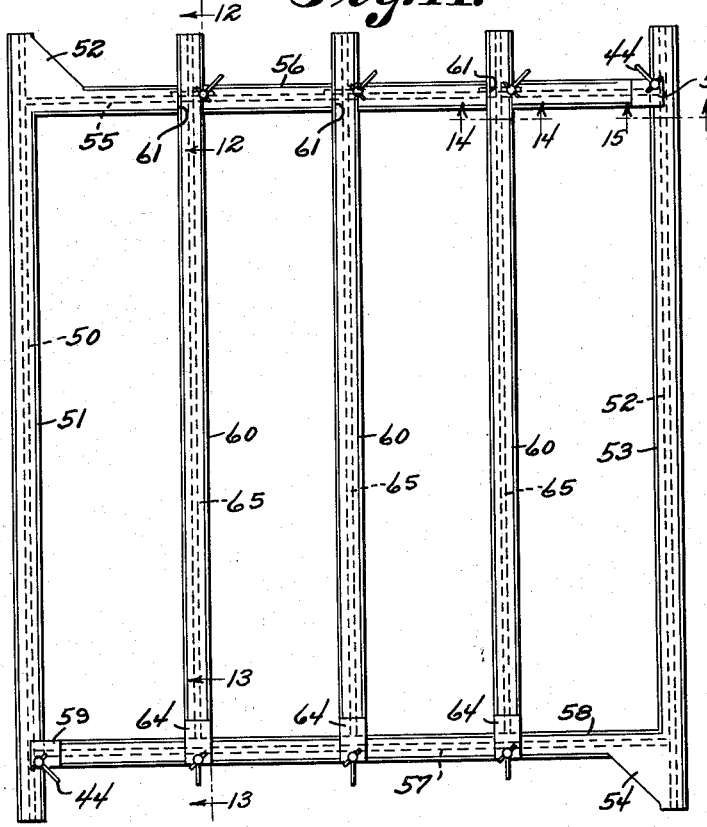

July 11, 1950 H. C. SEYMOUR 2,514,805
FORM FOR MAKING CONCRETE SLABS
Filed Feb. 9, 1948 5 Sheets-Sheet 4

INVENTOR.
Howard C. Seymour
BY Victor J. Evans & Co.
ATTORNEYS

July 11, 1950  H. C. SEYMOUR  2,514,805
FORM FOR MAKING CONCRETE SLABS
Filed Feb. 9, 1948  5 Sheets-Sheet 5
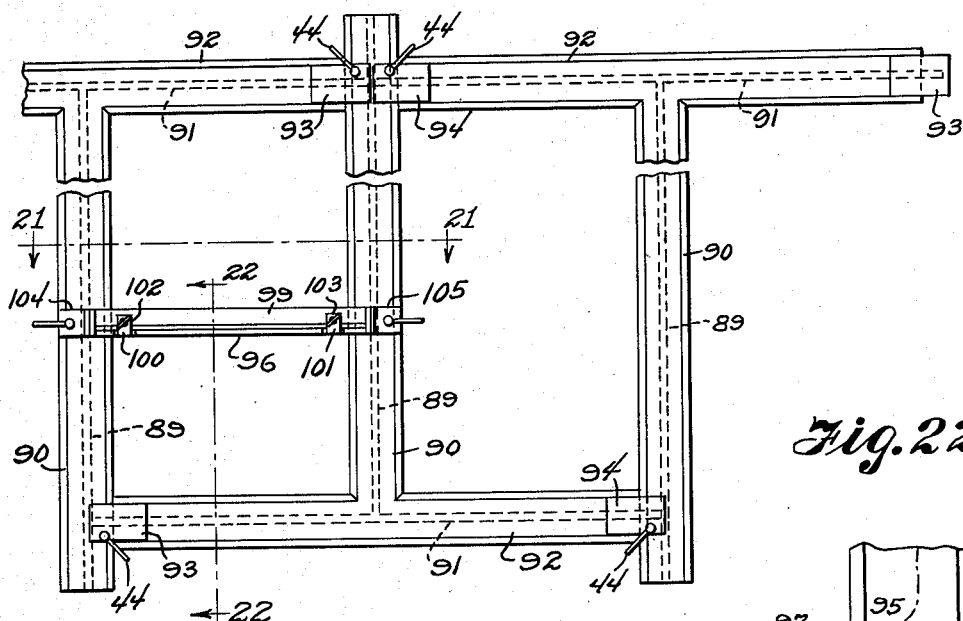
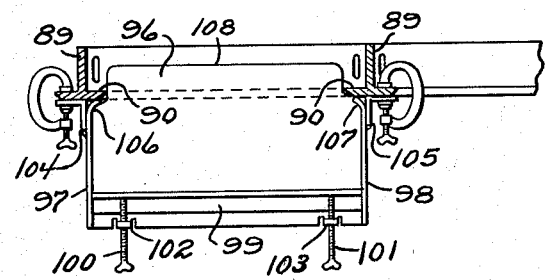
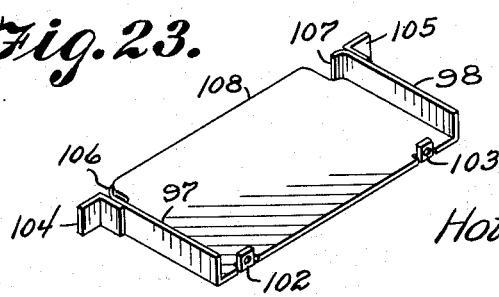
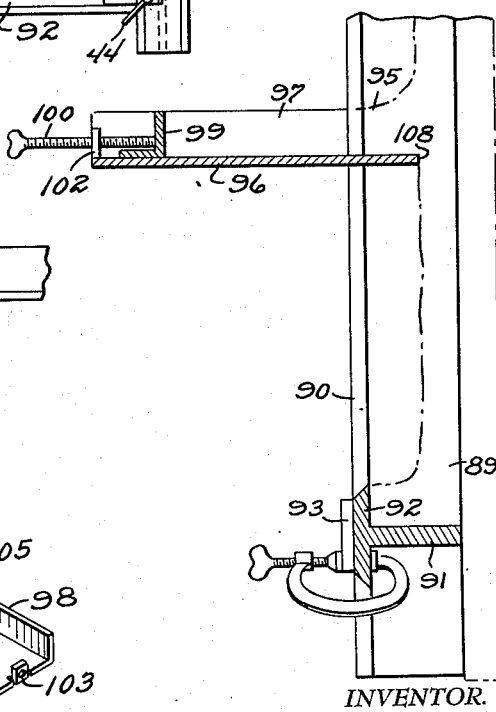
INVENTOR.
Howard C. Seymour
BY Victor J. Evans & Co.
ATTORNEYS Patented July 11, 1950

2,514,805

UNITED STATES PATENT OFFICE 2,514,805

FORM FOR MAKING CONCRETE SLABS

Howard C. Seymour, Washington, D. C.

Application February 9, 1948, Serial No. 7,087

3 Claims. (Cl. 25—121)

This invention relates to a mold or form or to a plurality of forms or to combinations of forms for precasting slabs or structural shapes of cementitious plastic, concrete, and the like for building units at a central point or plant, and in particular forms constructed of a plurality of adjustable units into which material may be sprayed in layers to form a block, slab, or other building shape or unit.

The purpose of this invention is to provide a comparatively simple and efficient method of precasting building units with plastic materials by spraying.

Various types of forms, molds, and the like have been provided for making bricks, facing tile, hollow tile and other building units but where units are cast with hollow areas therein they are too costly for universal use as cores of any type are not only difficult to manufacture but require skilled operators to handle. With this thought in mind this invention contemplates a form having adjustable side members and a back wherein the side members are provided with overhanging flanges behind which plastic materials may be sprayed, and in combination with which longitudinal and transverse struts may be used to provide structural reinforcing ribs across the units.

The object of this invention is, therefore, to provide a form for precasting plastic materials by spraying in which the parts are clamped together so that they may readily be adjusted to cast units of different sizes.

Another object of the invention is to provide a form for casting plastic materials by spraying wherein structural ribs are formed at the edges of the slabs cast in the form.

Another object of the invention is to provide a method of casting building units by spraying plastic materials wherein longitudinal and transverse ribs are formed on the units.

Another object of the invention is to provide means for forming a form precasting building materials by spraying the materials in which openings for windows and the likes may be provided through the units.

Another object of the invention is provide a form into which plastic materials may be sprayed to form units used in building construction in which outwardly projecting shelves may be provided on the units.

A further object of the invention is to provide adjustable forms into which plastic materials may be sprayed to form units used in building construction which are of simple and economical construction.

With these and other objects and advantages in view the invention consists of the new and novel combination, construction, and arrangement of parts as hereinafter more fully described, set forth in the claims appended hereto, and disclosed in the accompanying drawings forming part hereof, wherein:

Figure 1 is a view showing a slab with a continuous peripheral rib on the sides and ends illustrating a simple form of building unit adapted to be formed by spraying cementitious plastic material into the form.

Figure 2 is a view illustrating the form looking toward the back thereof.

Figure 3 is a view showing a front elevation of one of the T-shaped members of the form with parts broken away.

Figure 4 is a section through the member shown in Figure 3 taken on line 4—4 thereof, with parts broken away.

Figure 5 is a similar section showing the modification wherein slots with open ends are provided for holding reinforcing elements.

Figure 11 is a view showing a front elevation of a form illustrating a modification wherein the frame is formed with L-shaped members and struts are clamped thereon for forming longitudinal or vertical ribs.

Figure 12 is a detail taken on line 12—12 of Figure 11 showing a section through the upper member of the frame.

Figure 13 is a similar section taken on line 13—13 of Figure 11 showing the lower member of the frame.

Figure 14 is a section taken on line 14—14 of Figure 11 showing a reinforcing bar welded to the web of the frame.

Figure 15 is a similar section at the end of the frame taken on line 15—15 of Figure 11.

Figure 16 is a detail showing a method of forming a slot for a rib forming strut in the upper member of the frame.

Figure 20 is a view showing a front elevation of a form made with T-shaped members on which a frame for forming a shelf is clamped.

Figure 21 is a section taken on line 21—21 of Figure 20 showing the shelf forming frame clamped to the form.

Figure 22 is a section taken on line 22—22 of Figure 20 with parts broken away illustrating the position of the shelf forming frame.

Figure 23 is a detail illustrating the shelf forming frame with the adjustable outer bar and screws omitted.

Figure 10:
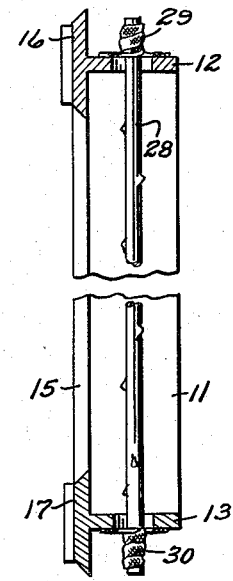
Figure 10 is a typical section through a member of the form illustrating the method of positioning reinforcing rods in the form.
Figure 8:
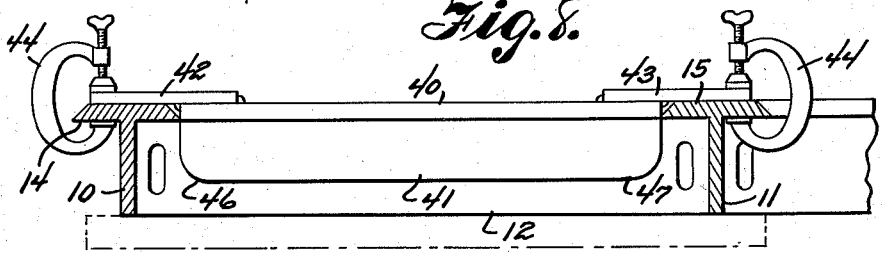
Figure 8 is a cross section through the form on an enlarged scale taken on line 8—8 of Figure 6.

Referring now to the drawings wherein like reference characters denote corresponding parts the cementitious plastic molding form of this invention includes, primarily, a form as illustrated in Figure 2 having two T-shaped elements with vertical webs 10 and 11 and horizontal webs 12 and 13 and the vertical webs are provided with flanges 14 and 15 with flanges 16 and 17 on the horizontal webs. The ends of the horizontally disposed webs 12 and 13 extend beyond the edges of the flanges 14 and 15 so that the ends thereof engage the surfaces of the webs 10 and 11, and the ends of the flanges 16 and 17 are spaced from the ends of the webs wherein with the joints assembled as shown in Figure 2, the ends of the flanges 16 and 17 abut the edges of the flanges 14 and 15 with the ends of the webs 12 and 13 extending beyond and against the webs 10 and 11. The two T-shaped members of the form are similar as it will be noted in Figures 3 and 4 that the ends of the web 12 extend to the points 18 and 19 and the flange 16 stops at the points 20 and 21. The ends of the flanges are provided with overlapping plates 22 and 23 by which the members may be secured together by C clamps as shown in Figure 8. The web 12 is also provided with slots 24 and 25 spaced from the ends and slots 26 and 27 adjacent the web 11 and reinforcing rods 28 may be placed through the slots as illustrated in Figure 10 wherein the ends of the rod are held by tape 29 and 30, and the tape also covers the remaining portions of the openings or slots. Similar slots are also provided in the web 13, and it will be understood that the openings or slots may be of any suitable size or shape and may be located at any point or points.

In Figure 5 a similar section is shown wherein a web 31 having a flange 32 is provided with slots 33 the ends of which are open.

Figure 7:
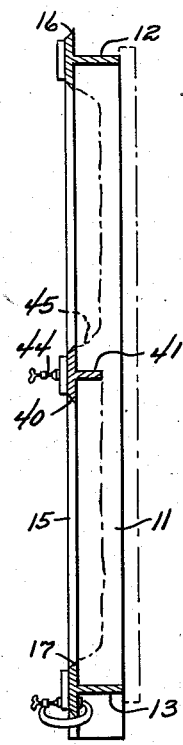
Figure 7 is a vertical section through the form taken on line 7—7 of Figure 6.

With the parts arranged in this manner a flat board as indicated by the dotted lines in Figures 7 and 8 is clamped against the edges of the webs 10, 11, 12, and 13 and the material is sprayed from the opposite side. The material is sprayed in layers with the part against the board forming a slab 34 and the material accumulating behind the flanges 14, 15, 16 and 17 forming the ribs 35, 36, 37, and 38 respectively, around the edges of the slab, thereby forming a unit as illustrated in Figure 1. The faces of the flanges 14 and 15 are provided with graduations 39, as shown in Figure 3 to facilitate adjusting the members in assembling the frame.

Figure 6:
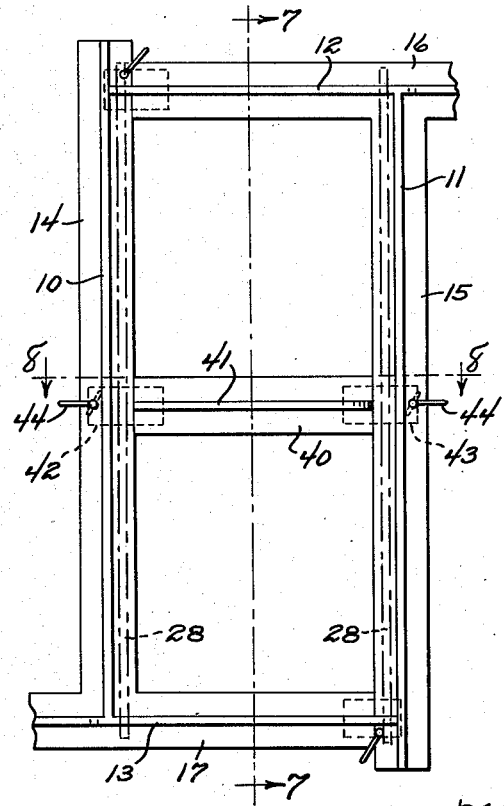
Figure 6 is a view showing a rear elevation of a form with a strut clamped thereon for forming a transverse rib across the slab.

The form shown in Figures 6 and 7 is similar to that illustrated in Figure 2, however, this form is provided with a transverse strut formed with a flange 40 and a web 41, and the flange is provided with extending plates 42 and 43 by which the strut may be clamped in position by C clamps 44, as shown in Figure 8. In this design the ends of the flange and web terminate at the edges of the flanges 14 and 15 wherein ribs at the sides of the slab will extend continuously and a rib 45 will be formed on the upper side of the strut as shown in Figure 7. The lower corners 46 and 47 of the web 41 are rounded to provide arcuate corners at the sides of the slab.

Figure 9:
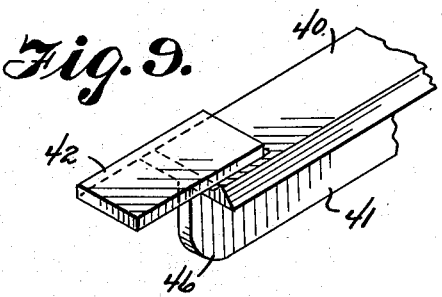
Figure 9 is a detail illustrating an end of the strut for forming the transverse rib with part broken away.
Figure 17:
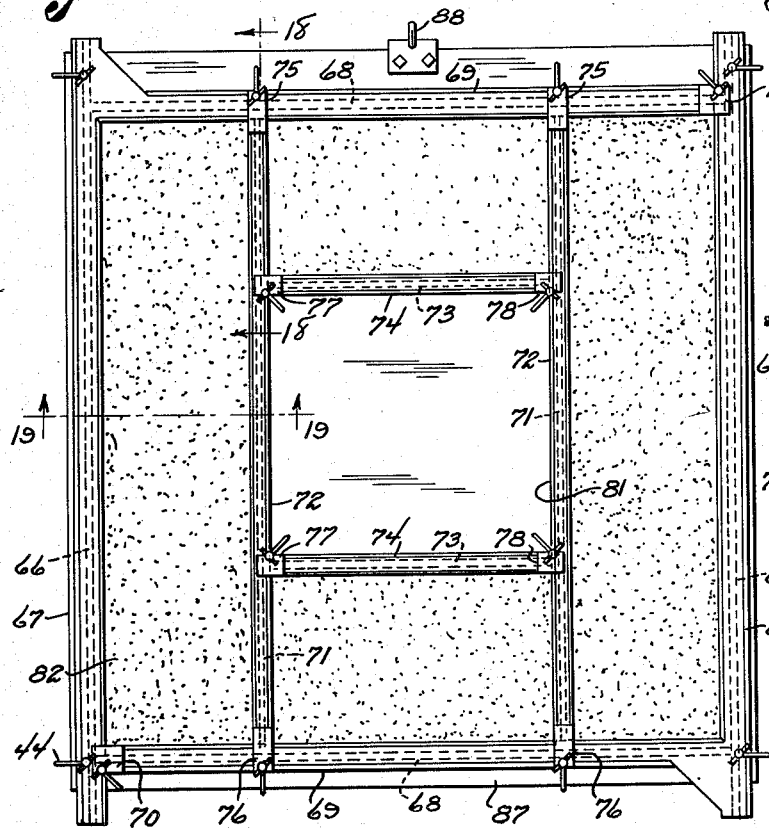
Figure 17 is a view showing a front elevation of a frame having struts for providing a window opening through the slab.

The forms illustrated in Figures 11 and 17 are formed with two L-shaped members with each arm thereof T-shape in cross section. In Figure 11 the frame is formed with a vertically disposed web 50 having a flange 51 with a gusset 52 at the corner, and also a web 52 with a flange 53 and a gusset 54 at the other side, and the member formed with the web 50 and flange 51 is provided with a perpendicularly disposed arm having a web 55 with a flange 56, and the member formed with the web 52 and flange 53 is provided with an arm having a web 57 and a flange 58. The ends of the perpendicular or horizontally disposed members are joined to the side members as shown in Figure 15 wherein the webs extend beyond the ends of the flanges and the flanges are provided with extending plates 59 through which the members are clamped together by the clamps 44. The form shown in Figure 11 is provided with vertically disposed struts 60, and in order to provide longitudinal adjustment the upper ends of the struts are slidably held in the end members, and as shown in Figure 16, flange 56 is provided with a gap 61 to receive the flange of the strut 60, and the web 55 is provided with a slot 62 to receive the web of the strut. A bar 63 is welded to the edge of the web to compensate for the material removed for the gap and slot. The lower ends of the struts 60 are formed similar to the ends of the transverse strut as shown in Figure 9, and the flange of the strut 60 is provided with a plate 64, as shown in Figure 13 by which the struts are clamped to the flange 58. The width of the webs 65 of the struts 60 is less than that of the webs of the side and end members of the form so that space will be provided for material of the slab wherein a continuous slab will be formed across the form with ribs at the sides of the struts.

Figure 18:
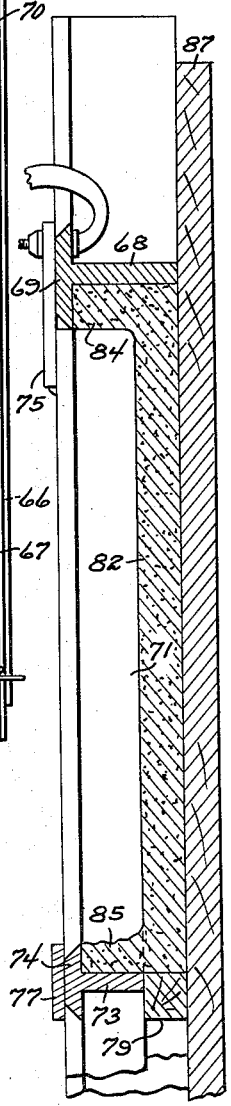
Figure 18 is a section taken on line 18—18 of Figure 17 showing the framing at the upper frame member and window opening strut.
Figure 19:
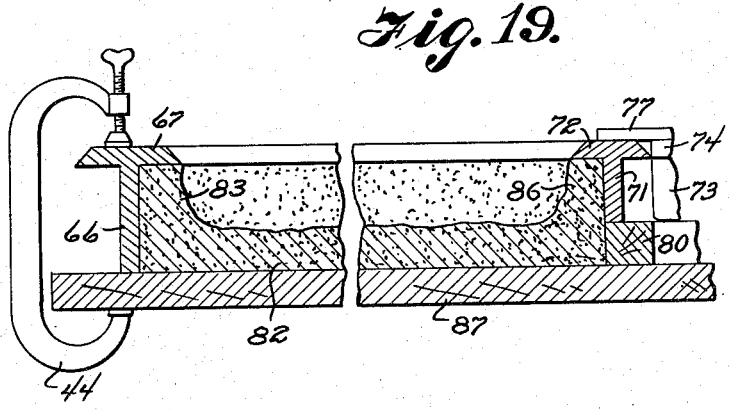
Figure 19 is a section taken on line 19—19 of Figure 17 showing the framing at the side of the window opening and illustrating a C-clamp for holding the back to the frame.

The form illustrated in Figures 17, 18 and 19 is similar to that shown in Figure 11 except that the two L-shape members are similar and the vertical and horizontal struts are similar to the transverse strut shown in Figure 6. In this design each L-shape member is formed with a web 66 and a flange 67 providing a vertical member and a web 68 with a flange 69 providing a horizontal member, and the ends of the horizontal members are provided with extending plates 70 by which they are clamped in position. The vertical struts are formed with webs 71 and flanges 72 and the transverse struts with webs 73 and flanges 74. The ends of the vertical struts are provided with plates 75 and 76 and the ends of the transverse struts with plates 77 and 78. With the parts positioned as shown and held together by C clamps, and with a wood frame having end members 79 and side members 80 positioned under the webs 73 and 71 respectively an opening 81 will be provided in a slab 82 formed with the form. The slab will be formed with ribs 83 at the sides and 84 at the ends and around the opening 81 the slab will have transverse ribs 85 and vertical ribs 86. In forming the slab a member 87 is clamped against the back of the form by suitable C clamps and the upper edge of the member 87 may be provided with a clevis 88 by which the form may be carried by a crane or the like.

The form illustrated in Figure 20 is made with a plurality of T-shape sections having vertical webs 89 with flanges 90 and horizontal webs 91 with flanges 92 and the flanges 92 are provided with over-lapping end plates 93 and 94 by which the sections are secured together by the C clamps 44. In this design a shelf frame is positioned on the form to form a projecting ledge 95 as shown in Figure 22. The shelf frame is formed with a plate 96 having end flanges 97 and 98 and an angle 99 is positioned on the plate and adjustably held by screws 100 and 101 which are threaded in ears 102 and 103 at the outer edge of the plate 96. Clip angles 104 and 105 are provided on the outer surfaces of the flanges 97 and 98 by which the frame is clamped in position as shown in Figure 21, and the flanges 97 and 98 are provided with arcuate inner ends 106 and 107, respectively, which provide arcuate corners at the inner edge of the shelf. The inner edge of the plate 96 extends to the point 108, as shown in Figures 21 and 22, being spaced from the back of the form to provide a continuous slab over the back with the shelf integral therewith. The shelf may be of any suitable size or shape and as many shelves as may be desired may be provided.

The members of the forms which are structural T-shapes with beveled edges on the flanges, may be provided in T or L forms or in straight struts, and these may be adjustably held in different positions to form building units of different sizes and shapes.

With the forms assembled a cementitious plastic, concrete, or the like, may be sprayed against the open side of the form with the form standing on edge or vertical, and as a layer of the material sets to a predetermined degree additional layers are sprayed on until the desired thickness is obtained. It will be noted that after one or two layers have been sprayed against the back to form the slab reinforcing rods or wire mesh may be inserted and then additional layers added to cover or embed the mesh or reinforcing. Reinforcing rods or the like may also be inserted in the flanges or ribs at the edges of the slab as shown in Figure 10. After the material has set the back may be removed and the slab taken from the form or mold.

It will be understood that modifications may be made in the design and arrangement of the parts without departing from the spirit of the invention.

What is claimed is:

1. In a collapsible form for sprayed concrete, the combination which comprises a plurality of shapes, T shaped in cross section having a web with inner and outer edges and having a flange extended from the outer edge positioned perpendicular to the web, said shapes having connecting plates extended from the ends thereof and positioned to overlap the flanges of adjoining shapes, and C clamps for clamping the connecting plates to flanges of adjoining shapes for temporarily maintaining the said shapes in assembled relation, the inner edges of the webs of the said shapes being positioned in a common plane whereby with the said shapes positioned against a panel, cementitious material sprayed against the form forms a flanged slab.

2. In a collapsible form for sprayed concrete, the combination which comprises a pair of L-shaped frames having end and side members T shaped in cross section each of said members having a web with inner and outer edges and having a flange extended from the outer edge perpendicular to the web, intermediate members also T shaped in cross section and having a web with inner and outer edges and a flange extended from the outer edge perpendicular to the web, the end members of said L-shaped frames having notches in the web and flanges thereof for receiving webs and flanges of the intermediate members, and means temporarily clamping the said frames and intermediate members together with the inner edges of the webs thereof in a common plane whereby with the said members positioned against a panel the cementitious material sprayed against the form forms a plurality of flanged slabs.

3. In a collapsible form for sprayed concrete, the combination which comprises a plurality of shapes, T shaped in cross section having a web with inner and outer edges and having a flange extended from the outer edge positioned perpendicular to the web, said shapes having connecting plates extended from the ends thereof and positioned to overlap the flanges of adjoining shapes, C clamps for clamping the connecting plates to flanges of adjoining shapes for temporarily maintaining the said shapes in assembled relation to form a rectangular shape frame having side and end members and an intermediate member parallel to the side members, the inner edges of the webs of the said shapes being positioned in a common plane whereby with the said shapes positioned against a panel cementitious material sprayed against the form forms a flanged slab, a shelf forming element channel shaped in cross section clamped to the side and intermediate member of the frame and extended outwardly therefrom, an angle extended across the outer end of the shelf forming element, means adjusting the position of the said angle, and means clamping the said shelf forming element to the members of the frame.

HOWARD C. SEYMOUR.

REFERENCES CITED

The following references are of record in the file of this patent:

UNITED STATES PATENTS

| Number | Name | Date |
|---|---|---|
| 849,392 | Herring | Apr. 9, 1907 |
| 947,702 | Rowley | Jan. 25, 1910 |
| 2,098,929 | Barnes | Nov. 9, 1937 |
| 2,416,559 | Wilson | Feb. 25, 1947 |